UNITED STATES PATENT OFFICE.

CECIL C. ROBERTS, OF MOUNT VERNON, OHIO.

WELDING COMPOUND.

1,283,909.　　　　　Specification of Letters Patent.　　Patented Nov. 5, 1918.

No Drawing.　　　Application filed August 15, 1916.　Serial No. 115,098.

*To all whom it may concern:*

Be it known that I, CECIL C. ROBERTS, a citizen of the United States, residing at Mount Vernon, in the county of Knox and State of Ohio, have invented certain new and useful Improvements in Welding Compounds, of which the following is a specification.

This invention has relation to chemical compounds and mixtures for use in promoting the joining of metallic parts in welding processes, soldering or the like, said compound depending upon the property of dissolving the oxids which form on the surface of the parts when heated, as a scale, and which, if not removed destroys the cohesion of the parts thereby preventing the formation of a rigid joint.

Another object of the invention is to provide a compound of the character and for the purpose set forth, which contains in addition to usual substances for dissolving the metallic oxids, a certain proportion of a natural aluminum containing mineral.

In addition to the foregoing, my invention comprehends the proportion of ingredients to be hereinafter described and more particularly set forth in the appended claim.

Before proceeding with a detailed description of the compound and the manner of its use, attention is directed to the fact that while this compound is intended primarily and particularly for welding or joining iron and steel parts, nevertheless the welding of other metals may be accomplished with various degrees of success. A certain proportion of finely divided iron is employed in the compound when the same is to be used for welding iron or steel, and if the compound is to be used in joining or brazing copper or the like, it is obvious that a certain proportion of that metal in a finely divided state may be substituted for the iron.

It has been my experience that the most satisfactory results from the use of my compound are obtained when the ingredients are combined in the following proportions:

Iron (or steel) filings_____ 20 parts
Sand_____ 50 parts
Powdered glass_____ 5 parts
Cryolite_____ 10 parts
Borax (calcined)_____ 15 parts These materials are first reduced to a fine or pulverized condition, and subsequently mixed in the proportions named.

The sand employed is preferably of the character known as "glass sand" as the same is practically pure silica. The borax before pulverizing should first be calcined so as to expel its water of crystallization; and I have found by experience that the commercial variety of borax is more adapted and is productive of the best results in the use of my compound than the more purified variety. This is due to the fact that the borax contains in addition small proportions of oxid of iron, aluminum, and calcium, which facilitates the action of the compound in a manner to be presently obvious.

To those familiar with the art to which this invention appertains, its use will be quite obvious, it may be stated however, that the parts to be joined are heated to the desired temperature and the compound sprinkled thereover before joining the parts by forging or otherwise. The action of this compound, as in compounds of a similar nature is to dissolve the metallic oxids which are formed on the heated parts, and which oxids if not removed would form a scale separating the meeting surfaces and thereby preventing the formation of a firm and rigid joint. The compound therefore acts as a flux. Sand and borax are the agents whereby the oxids are dissolved and the glass is used to reduce the fluidity of the metal or to prevent the same from running.

The present invention however, comprehends in addition to providing the usual fluxing agents, the provision of a natural mineral compound of aluminum such as cryolite, fluorite, or other combinations of aluminum and fluorin. Other compounds of aluminum with acids other than fluorin may be employed without departing from the spirit of the invention.

While I have set forth with some degree of particularity stating the exact ingredients of this compound, and the specific manner of its combination in the proportions given, I nevertheless realize that alterations in the proportions may be made, and I therefore reserve the right and privilege of substituting ingredients in the compound of similar nature, or otherwise altering the proportions of the ingredients as hereinbefore given, without departing from the spirit of the invention or the scope of the appended claim.

Having thus described my invention what I claim as new and desire to secure by Letters Patent is:

A welding compound which includes finely divided iron in the proportion of twenty parts thereof, fifty parts of sand, five parts of glass, ten parts of cryolite, and fifteen parts of calcined borax, thoroughly mixed together.

In testimony whereof I affix my signature in presence of two witnesses.

CECIL C. ROBERTS.

Witnesses:
 JEANNETTE SAPP,
 B. E. SAPP.